A. VINCENT.
PAN HANDLE.
APPLICATION FILED DEC. 24, 1907.
901,400.
Patented Oct. 20, 1908.
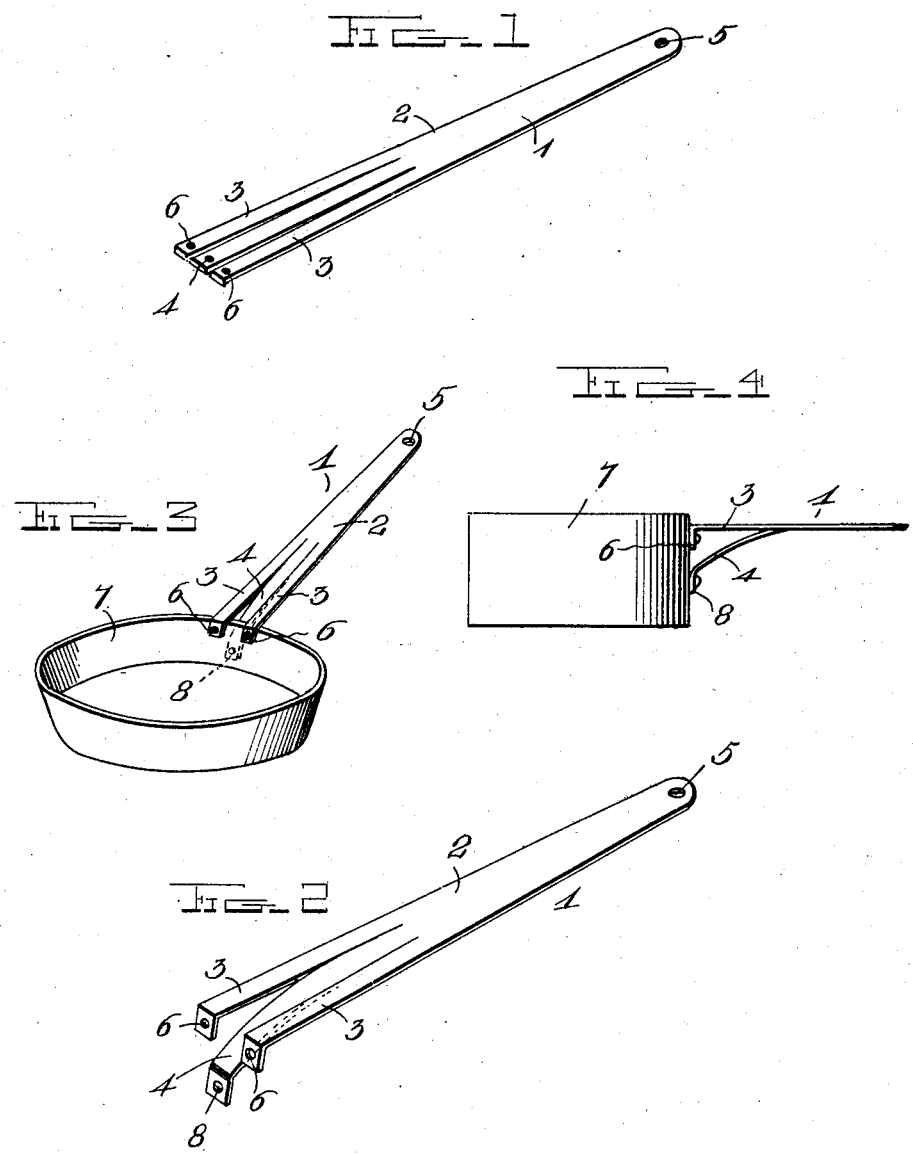
Witnesses
C. Menker
C. H. Griesbauer.
Inventor
Augustus Vincent
By H. B. Willson & Co.
Attorneys

UNITED STATES PATENT OFFICE.

AUGUSTUS VINCENT, OF BROOKLYN, NEW YORK.

PAN-HANDLE.

No. 901,400.  Specification of Letters Patent.  Patented Oct. 20, 1908.

Application filed December 24, 1907. Serial No. 407,977.

*To all whom it may concern:*

Be it known that I, AUGUSTUS VINCENT, a citizen of the United States, residing at Brooklyn, in the county of Kings and State of New York, have invented certain new and useful Improvements in Pan-Handles; and I do declare the following to be a full, clear, and exact description of the invention, such as will enable others skilled in the art to which it appertains to make and use the same.

My invention relates to handles, and particularly those used upon sauce-pans, dippers and all other kitchen utensils.

The object of the device is to provide a cheap structure of this type which will be strong and easily applied to the article.

Further objects of the invention will appear as the specific description is read in connection with the accompanying drawings, in which,—

Figure 1 is a perspective view of the blank; Fig. 2 is a perspective view of the handle with the parts bent into the shape for application to the utensil to which it is to be attached; Fig. 3 shows a perspective view of the device attached to a utensil; and Fig. 4 shows a side elevation of the handle applied to another form of utensil.

Referring more especially to the drawings, 1, represents a body which is composed of a shank, 2, the legs 3 and a truss member 4. The shank may have any shape given to it which is found necessary and is provided at its extremity with an aperture 5 so that the handle may be connected with a supporting hook or nail. The legs 3 extend outwardly from the shank in alinement therewith and are parallel. At the outer end of each leg there is a right angular lug apertured at 6 to receive a fastening rivet which passes through the utensil 7 and the lug. The truss member 4 is struck up from the body between the legs 3, and projects diagonally thereover and its end is provided with a downwardly bent apertured lug 8, which is adapted to engage the utensil at a point below the lugs 6.

In Fig. 3, I have shown the lug 6 overhanging the edge of the utensil and riveted thereto and the lug 8 riveted to the outside of the utensil, and in Fig. 4, the lugs 6 and 8 are both riveted to the outside of the utensil, one above the other.

Having thus described my invention, what I claim is,—

A handle for cooking receptacles comprising a single sheet metal body having a straight flat handle portion, a truss member stamped centrally from the body in line therewith and extending at an angle to the plane of said handle portion, a pair of parallel legs formed in a plane with the handle portion of the body by stamping up the truss member, and depending right-angular lugs on the truss member and legs.

In testimony whereof I have hereunto set my hand in presence of two subscribing witnesses.

AUGUSTUS VINCENT.

Witnesses:
CHRISTOPHER C. MOLLENHAUER,
EDWARD J. CHRISTOPHER.